United States Patent
Burton, III et al.

(10) Patent No.: US 8,139,583 B1
(45) Date of Patent: Mar. 20, 2012

(54) COMMAND SELECTION IN A PACKET FORWARDING DEVICE

(75) Inventors: Charles Frederick Burton, III, Cary, NC (US); Christopher J. Young, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 416 days.

(21) Appl. No.: 12/242,686

(22) Filed: Sep. 30, 2008

(51) Int. Cl.
*H04L 12/28* (2006.01)

(52) U.S. Cl. ........................ 370/392; 370/389

(58) Field of Classification Search .................. None
See application file for complete search history.

(56) References Cited

U.S. PATENT DOCUMENTS

| | | |
|---|---|---|
| 3,725,864 A | 4/1973 | Clark et al. |
| 3,984,817 A | 10/1976 | Barbour et al. |
| 4,228,496 A | 10/1980 | Katzman et al. |
| 4,380,046 A | 4/1983 | Fung et al. |
| 5,046,023 A | 9/1991 | Katsura et al. |
| 5,247,519 A | 9/1993 | Snowden et al. |
| 5,293,577 A | 3/1994 | Hueske et al. |
| 5,367,650 A | 11/1994 | Sharangpani et al. |
| 5,577,256 A | 11/1996 | Muramatsu et al. |
| 5,710,923 A | 1/1998 | Jennings et al. |
| 5,829,016 A | 10/1998 | Sharma et al. |
| 5,835,925 A | 11/1998 | Kessler et al. |
| 5,838,993 A | 11/1998 | Riley et al. |
| 5,943,493 A | 8/1999 | Teich et al. |
| 6,002,881 A | 12/1999 | York et al. |
| 6,006,013 A | 12/1999 | Rumph et al. |
| 6,178,491 B1 | 1/2001 | Ben-Ephraim et al. |
| 6,185,214 B1 | 2/2001 | Schwartz et al. |
| 6,292,838 B1 | 9/2001 | Nelson |
| 6,304,924 B1 | 10/2001 | Varma |
| 6,530,010 B1 | 3/2003 | Hung et al. |
| 6,564,238 B1 | 5/2003 | Kim et al. |
| 6,587,466 B1 | 7/2003 | Bhattacharya et al. |
| 6,781,992 B1 | 8/2004 | Rana et al. |

(Continued)

FOREIGN PATENT DOCUMENTS

EP 0945784 9/1999

(Continued)

OTHER PUBLICATIONS

Non-Final Office Action for U.S. Appl. No. 10/814,774 Mailed Dec. 3, 2009, 19 Pages.

(Continued)

*Primary Examiner* — Ayaz Sheikh
*Assistant Examiner* — Faiyazkhan Ghafoerkhan
(74) *Attorney, Agent, or Firm* — Blakely, Sokoloff, Taylor & Zafman LLP

(57) ABSTRACT

Packet modification is performed in the switch fabric by selecting a conditional command belonging to a set of commands for modifying a packet. The set of commands is identified based on an index value, and selecting a conditional command belonging to the set of commands is based on a mask value, where the index and mask values are determined based on data in the packet undergoing modification, such as the packet's source and destination, or incoming label. Among other advantages, controlling packet modification in the switch fabric through selecting a conditional command belonging to a set of commands allows multiple sets of commands to be replaced with a single set of commands, resulting in a more efficient use of available external memory.

15 Claims, 13 Drawing Sheets

U.S. PATENT DOCUMENTS

| | | | |
|---|---|---|---|
| 6,795,435 B1 | 9/2004 | Jouppi et al. | |
| 6,813,689 B2 | 11/2004 | Baster, III | |
| 6,842,457 B1 | 1/2005 | Malalur | |
| 6,993,663 B1 | 1/2006 | Paya et al. | |
| 7,114,053 B2 | 9/2006 | Goss | |
| 7,502,374 B1* | 3/2009 | Parker et al. | 370/395.32 |
| 7,546,423 B2 | 6/2009 | Underbrink et al. | |
| 7,565,343 B2 | 7/2009 | Watanabe | |
| 7,630,402 B2 | 12/2009 | Un et al. | |
| 7,639,712 B2 | 12/2009 | Un et al. | |
| 7,675,915 B2* | 3/2010 | Parker et al. | 370/392 |
| 7,737,983 B2 | 6/2010 | Brothers et al. | |
| 7,822,032 B1* | 10/2010 | Parker et al. | 370/392 |
| 2002/0095512 A1 | 7/2002 | Rana et al. | |
| 2003/0169737 A1 | 9/2003 | Lavigne et al. | |
| 2003/0204840 A1 | 10/2003 | Wu | |
| 2003/0214956 A1 | 11/2003 | Navada et al. | |
| 2003/0225907 A1 | 12/2003 | Krishnan | |
| 2003/0236813 A1* | 12/2003 | Abjanic | 709/102 |
| 2004/0066780 A1 | 4/2004 | Shankar et al. | |
| 2004/0174898 A1 | 9/2004 | Kadambi et al. | |
| 2005/0044199 A1 | 2/2005 | Shiga et al. | |
| 2005/0044338 A1 | 2/2005 | Goss | |
| 2005/0111360 A1 | 5/2005 | Jin et al. | |
| 2005/0220094 A1* | 10/2005 | Parker et al. | 370/389 |
| 2007/0291754 A1 | 12/2007 | Okagawa et al. | |
| 2007/0291791 A1 | 12/2007 | English et al. | |

FOREIGN PATENT DOCUMENTS

| | | |
|---|---|---|
| WO | WO-03/081857 | 10/2003 |
| WO | WO2005099179 | 10/2005 |

OTHER PUBLICATIONS

Non-Final Office Action for U.S. Appl. No. 10/814,774 Mailed Nov. 9, 2007, 20 Pages.
Final Office Action for U.S. Appl. No. 10/814,774 Mailed Aug. 19, 2008, 18 Pages.
Final Office Action for U.S. Appl. No. 10/814,774 Mailed Aug. 3, 2009, 16 Pages.
Final Office Action for U.S. Appl. No. 10/814,774 Mailed Apr. 21, 2010, 7 Pages.
Notice of Allowance and Fees for U.S. Appl. No. 10/813,731 Mailed Aug. 1, 2007, 11 Pages.
Supplemental Notice of Allowance and Fees for U.S. Appl. No. 10/813,731 Mailed Aug. 20, 2007, 4 Pages.
Non-Final Office Action for U.S. Appl. No. 11/924,500 Mailed Aug. 12, 2009, 9 Pages.
Final Office Action for U.S. Appl. No. 11/924,500 Mailed Feb. 4, 2010, 10 Pages.
Non-Final Office Action for U.S. Appl. No. 10/814,774 Mailed Mar. 23, 2009, 10 Pages.
Notice of Allowance and Fees for U.S. Appl. No. 11/924,500 Mailed Jul. 13, 2010, 10 Pages.
Notice of Allowance and Fees for U.S. Appl. No. 10/814,774 Mailed Jul. 9, 2010, 11 Pages.
Supplementary Search Report for European Patent Application No. 05732725.6 Mailed Feb. 7, 2011, 4 pages.
International Search Report and Written Opinion for International Application No. PCT/US05/10543 mailed Apr. 24, 2006, 4 pages.
Decasper, Dan, et al., "Router Pluggins: A Software Architecture for Next-Generation Routers", vol. 8, No. 1, Jan. 1, 2000, 14 pages.

* cited by examiner

COMMAND SELECTION IN A PACKET FORWARDING DEVICE

TECHNICAL FIELD

The present invention relates to the field of computer networks and internetworking communications technologies. In particular, the present invention relates to selecting commands for packet modification in a packet forwarding device.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, Extreme Networks, Inc., All Rights Reserved.

BACKGROUND AND RELATED ART

A switch is a packet-forwarding device, such as a bridge (layer 2 switch) or a router (layer 3 switch), that determines the destination of individual data packets (such as Ethernet frames) and selectively forwards them across a packet switched network (such as an Internet Protocol ("IP") or Multi-Protocol Label Switching ("MPLS") packet switched network) according to the best route to their destination.

In addition to forwarding the packets, switches often perform programmable packet modifications on packets before forwarding them to their respective destinations. For example, a packet may require encapsulation or de-capsulation, or label switching, prior to being forwarded.

In today's packet-forwarding devices, much of the packet forwarding is performed in a switch fabric. A switch fabric is a hardware component of the packet-forwarding device. Because it is a hardware component, the switch fabric provides high-speed forwarding performance that cannot generally be achieved with software-based components. However, incorporating new, proprietary and/or enhanced features into the switch fabric, such as those supporting packet-modification, can be expensive. For example, such features may require the creation of new customized and/or programmable chipsets upon which the switch fabric is based. Alternatively, packet modification can be performed in software rather than in the switch fabric, but this can impair the performance and efficiency of the forwarding function of the packet forwarding device, especially when handling large volumes of packets.

Attempts to exploit the abilities of existing programmable chipsets to support new, proprietary and/or enhanced features for such things as packet modification include the use of an index value to identify a corresponding set of predefined commands and data that may be used to perform packet modifications on packets requiring modification prior to being forwarded. The index values are generally stored in tables along with certain packet information to which the index values pertain, such as the particular source/destination combinations that may be present in an inbound packet. The tables, as well as the sets of predefined commands and data to which the index values correspond are typically stored in external memory, but the packet modification is itself carried out in the switch fabric in order to achieve better forwarding performance and efficiency. In this manner, the indexes, commands and data can be updated as needed to accommodate changing requirements for modifying packets without having to update the switch fabric.

One of the shortcomings associated with using an index value to identify commands and data sets for modifying a packet is the lack of sufficient external memory in the switch to store the tables in which the index values are stored, as well as the increasing number of different sets of commands and data that are needed to support the increasing varied types of packet traffic being forwarded. This is especially true as the number of potential connections in the packet switched network increase and the ability of a switch to support new and changed protocols and encapsulation/de-encapsulation techniques becomes more important.

SUMMARY

According to one aspect of the invention, a method and system is provided for controlling packet modification performed in a switch fabric through selecting a conditional command belonging to a set of commands for modifying a packet. In an embodiment, the set of commands is identified based on an index value, and selecting a conditional command belonging to the set of commands is based on a mask value, where the index and mask values are determined based on data in the packet undergoing modification, such as the packet's source and destination, or incoming label. Among other advantages, controlling packet modification in the switch fabric through selecting a conditional command belonging to a set of commands allows multiple sets of commands to be replaced with a single set of commands, resulting in a more efficient use of available external memory.

According to one aspect of the invention, the packet undergoing modification is assigned an index value based on a lookup to a receive table that maps data from the packet, such as the source and/or destination of the packet, to a predefined index value. The assigned index value may be stored along with the packet in packet memory and subsequently used during packet modification to identify the set of commands for modifying the packet.

According to one aspect of the invention, the packet undergoing modification is further assigned a mask value based on the processing of the packet when it was received. The assigned mask value may be stored along with the packet and index value in packet memory, and subsequently used during packet modification for tailoring the set of commands to the packet undergoing modification, the set of commands having been identified based on the assigned index value. Tailoring the set of commands to the packet undergoing modification includes selecting or not selecting at least one of the conditional commands in the set of commands for use during packet modification.

According to one aspect of the invention, the assigned mask value is generated during one or more of the receive packet processing cycles. For example, the mask value may be generated from multiple lookups to receive tables, the results of which are resolved down to a single mask value. According to one aspect of the invention, the assigned mask value is used to access mask information, referred to as a mask set, which is associated with the set of commands that was identified based on the assigned index value.

According to one aspect of the invention, during modification processing of the packet, the mask set is used in conjunction with individual commands in the identified set of commands to determine whether at least one of the conditional commands belonging to the set of commands, if any, has been selected or not selected for use during modification of the packet, i.e., to determine whether or not to execute the command. The mask set is typically formatted as a 32-bit vector in which a bit of the vector corresponds to a conditional command in the set of commands, the bit indicating whether to select or not select the conditional command for execution. For example, a bit value of "1" can be used to indicate that the corresponding conditional command in the set of commands should be selected for execution, whereas a bit value of "0" can be used to indicate that it should not.

In addition to the aspects and advantages of the present invention described in this summary, further aspects and advantages of the invention will become apparent to one skilled in the art to which the invention pertains from a review of the detailed description that follows, including aspects and advantages of an apparatus to carry out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and apparatus for command selection in a packet forwarding device, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system or a packet-forwarding device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
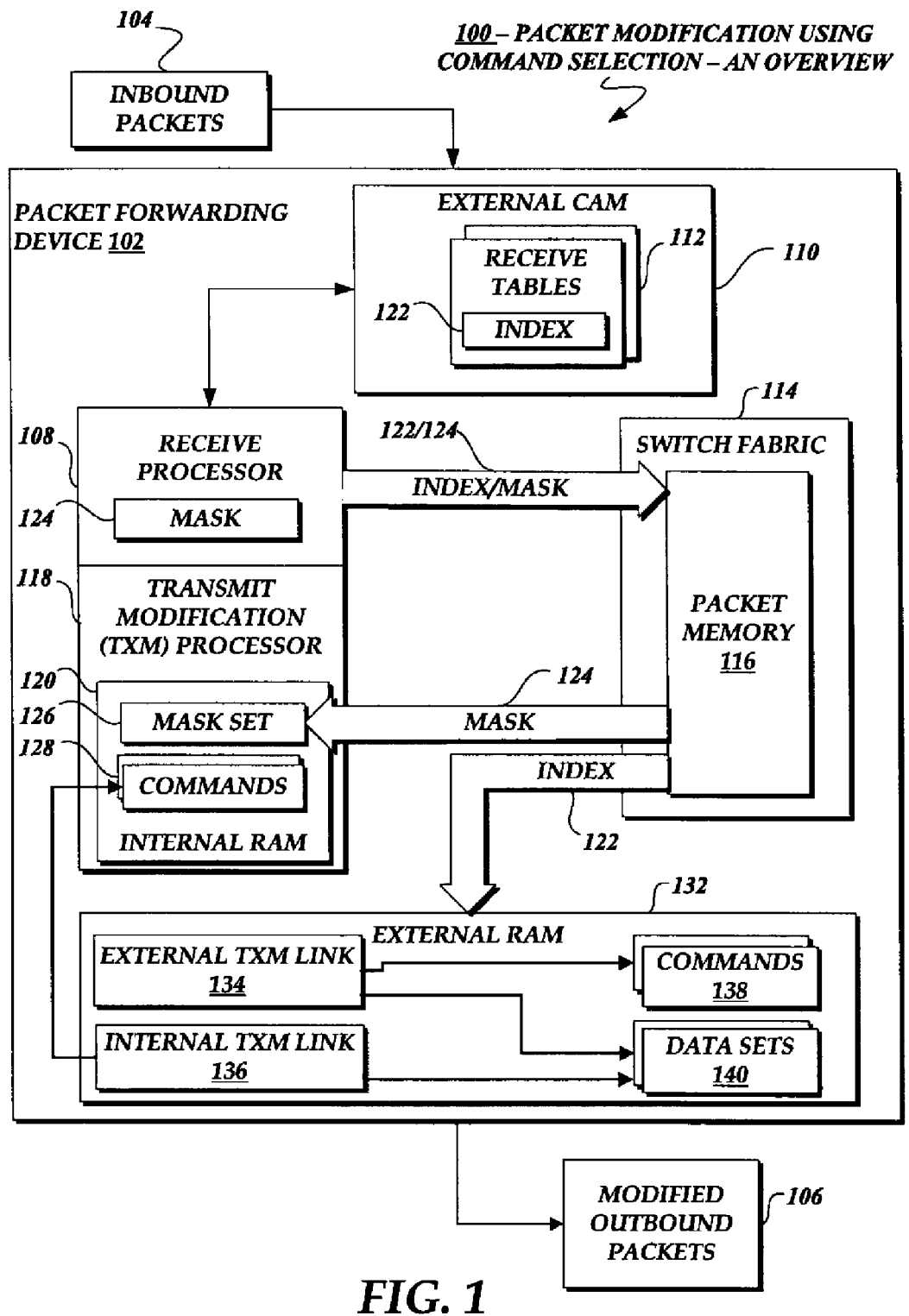
FIG. 1 is a block diagram illustrating certain aspects of command selection in a packet-forwarding device in accordance with an embodiment of the invention.

FIG. 1 is a block diagram illustrating certain aspects of command selection in a packet-forwarding device in accordance with an embodiment of the invention. As illustrated, inbound packets 104 to a packet forwarding device 102, such as switch or router, are processed in an address filter/receive processor chip 108 having access to content addressable memory (CAM) 110 that is typically external to other components of the switch. The packets may be transmitted using a forwarding protocol such as the Internet Protocol (IP) or the Multi-Protocol Label Switching (MPLS). The external CAM 110 is used to store receive tables 112 that may represent a forwarding data base (FDB) and/or an inbound label map (ILM), or the like.

The receive tables 112 map certain inbound packet information, such as the packets' source and/or destination addresses, or labels, to other data used by the switch 102 to process the packet. As illustrated, the other data to which the inbound packet information is mapped may include an index value 122 that is used by the switch to identify a set of commands having one or more conditional commands that may be selected for use during modification of the packet in accordance with an embodiment of the invention.

In a typical embodiment, the receive processor 108 operates in conjunction with the receive tables 112 to lookup the index value 122 to which the inbound packet information from the current received inbound packet 104 is mapped. The index value 122 is associated with the inbound packet 104 for subsequent use during packet modification. In one embodiment, the index value 122 is passed along with the inbound packet 104 for storage in packet memory 116 in the switch fabric 114 until the switch 102 is ready to perform the packet modifications. For example, the index value 122 may be inserted into the address filter header of the packet 104 prior to being stored in packet memory 116. Of course, other techniques for associating the index value 122 with the inbound packet 104 for subsequent use during packet modification may be employed without departing from the scope of the subject matter of the claims of the present invention.

The receive processor 108 further generates a mask value 124 for the inbound packet 104 as will be described in further detail with reference to FIG. 2. Once generated, the mask value 124 is also associated with the inbound packet 104 for subsequent use during packet modification. In one embodiment, similarly to the index value 122, the mask value 124 may be passed along with the inbound packet 104 for storage in packet memory 116 in the switch fabric 114 until the switch 102 is ready to perform the packet modifications. For example, the mask value 124 may be inserted into the address filter header of the packet 104 prior to being stored in packet memory 116. Of course, other techniques for associating the index value 122 with the inbound packet 104 for subsequent use during packet modification may be employed without departing from the scope of the subject matter of the claims of the present invention.

In a typical embodiment, when the switch 102 is ready to modify the packet 104, the transmit modification (Txm) processor 118 uses the index value 122 that was associated with the packet 104 to point to external RAM 132 to locate a Txm link data structure 134/136 stored in the external RAM. The Txm link data structure 134/136 points to sets of commands 128/138 and, in some cases, data sets 140 that may be used to modify the packet 104 prior to being forwarded. The Txm link data structures are designated as external Txm links 134 when they point to sets of commands 138 that are also stored in external RAM 132, whereas the Txm link data structures are designated as internal Txm links 136 when they point to sets of commands 128 that are stored in internal RAM 120 in the Txm processor 118. The data sets 140 to which the external or internal Txm links point to are generally stored in external RAM 132, even when the sets of commands 128 to which the internal Txm links 136 point to are stored in internal RAM.

In one embodiment, once the set or sets of commands 128/138 and any associated data sets 140 have been located through the use of the index value 122 and corresponding Txm link data structure 134/136, the Txm processor 118 uses the mask value 124 that the receive processor 108 associated with the inbound packet 104 to point to and locate a mask set 126. The Txm processor 118 can then apply the mask set 126 to the set or sets of commands 128/138 to tailor them to properly modify the inbound packet 104 to produce the modified outbound packets 106.

Figure 2:
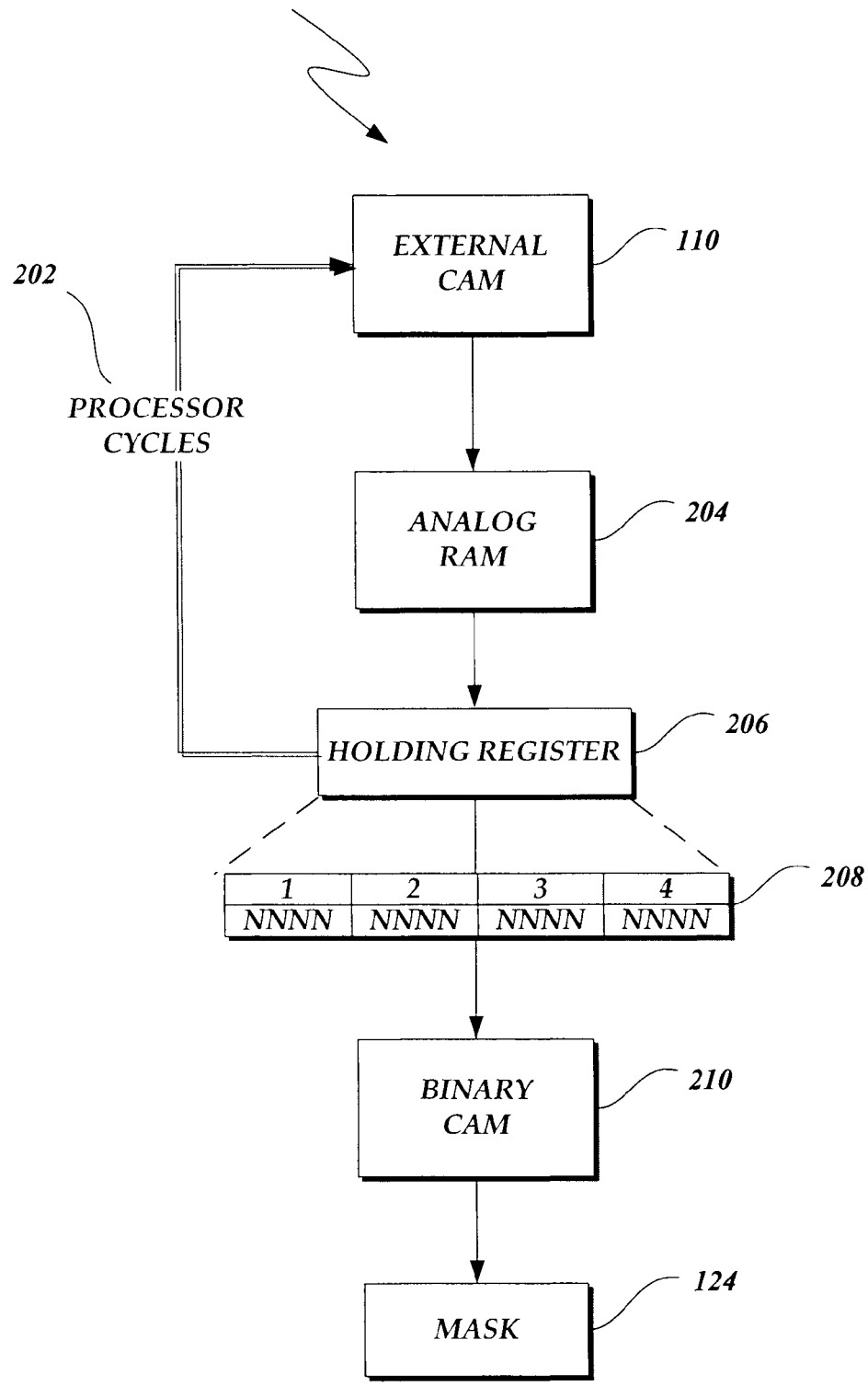
FIG. 2 is a block diagram illustrating certain other aspects of command selection in a packet-forwarding device in accordance with an embodiment of the invention.

FIG. 2 is a block diagram illustrating certain other aspects of command selection in a packet-forwarding device in accordance with an embodiment of the invention. Specifically, FIG. 2 illustrates a mask assembly overview 200 that may be employed in accordance with an embodiment of the invention. In one embodiment, the generation of the mask value 124 for the inbound packet 104 includes returning an analog RAM (ARAM) 204 resident mask data of 6 bits for each packet processor cycle 202 that matches the external CAM 110. For example, four cycles that match the external CAM 110 would result in the return of four ARAM-resident mask data values 204 of 6 bits each. The first 2 bits of each of the returned mask data values specifies a location in a holding register 206, e.g., location 1, 2, 3 or 4, in which to assemble the last 4 bits (NNNN) as illustrated in reference 208. Upon completion of the packet processor cycles 202 for the inbound packet 104, the assembled bits 208 in the holding register 206 (generally 16 bits after four processing cycles) are reduced to a smaller final mask value 124 (generally 6 bits) by matching the assembled bits in the holding register against a binary CAM 210 (generally a 64-entry×16-bit key binary CAM). In one embodiment, the matching address in the binary CAM 210 is used as the final mask value 124. Of course, other techniques for assembling the final mask value 124 for subsequent use during packet modification may be employed without departing from the scope of the subject matter of the claims of the present invention.

Figure 3:
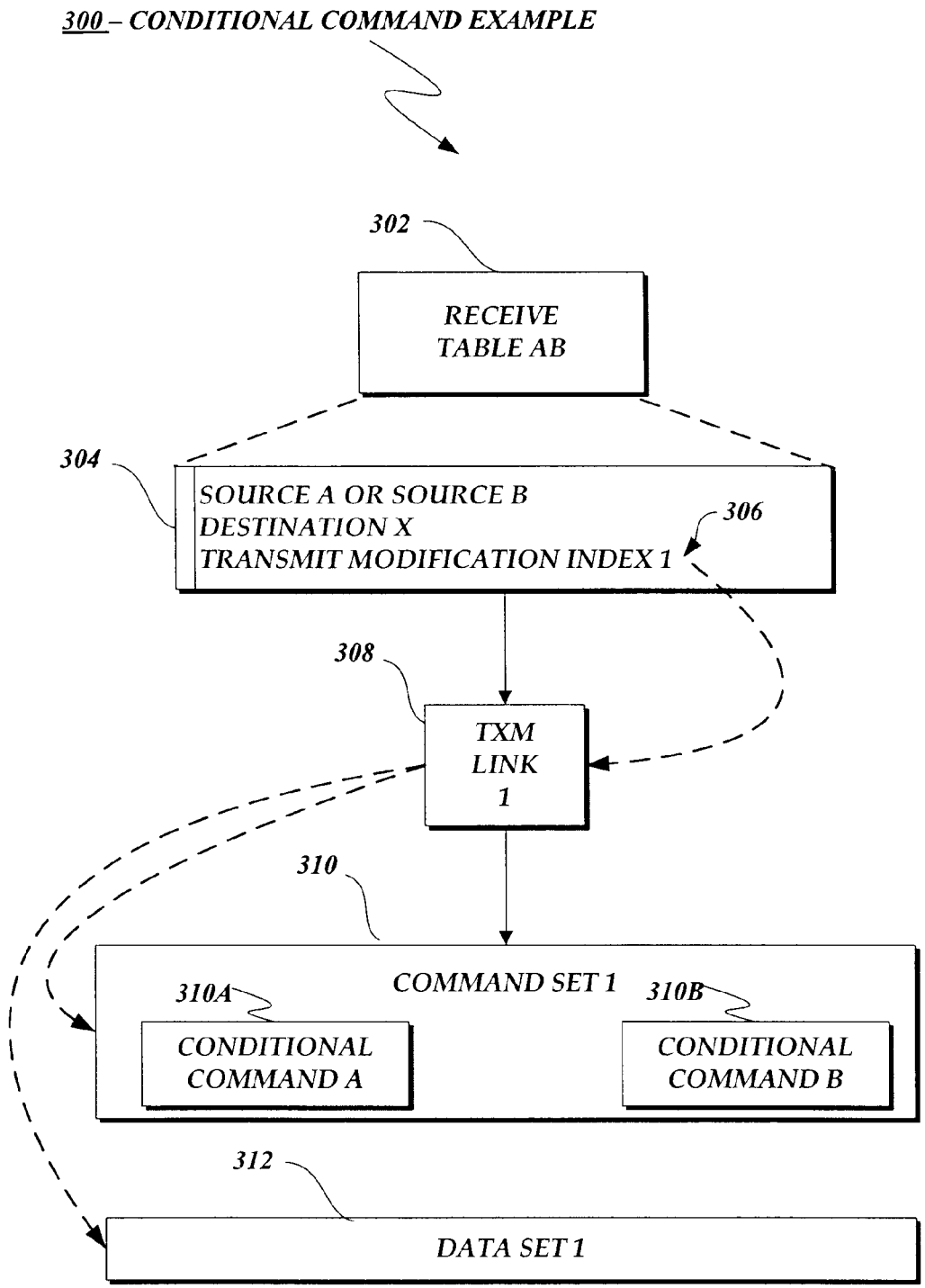
FIG. 3 is a block diagrams illustrating certain other aspects of command selection in a packet-forwarding device in accordance with an embodiment of the invention, including an overview of a conditional command example including an exemplary assigned index value and corresponding link structure, command set and data set.
Figure 4A:
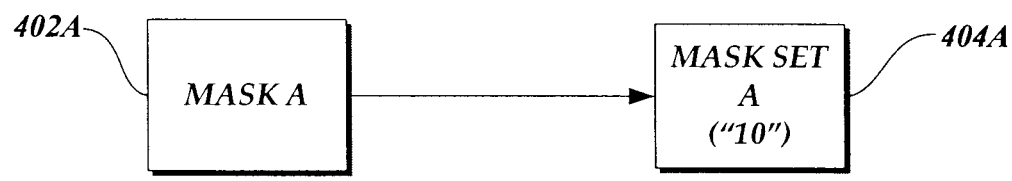
FIGS. 4A-4B and 5A-5B are block diagrams illustrating exemplary mask values and corresponding mask sets for command selection in a packet-forwarding device in accordance with an embodiment of the invention.
Figure 4B:
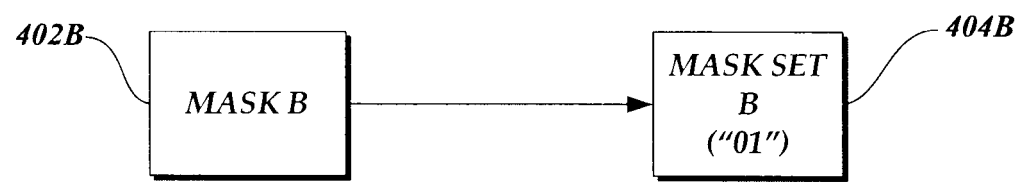

FIG. 3 is a block diagrams illustrating certain other aspects of command selection in a packet-forwarding device in accordance with an embodiment of the invention, including an overview of a conditional command example 300 including an exemplary assigned index value 306 and corresponding link structure 308, command set 310 and data set 312.

In one embodiment, a receive table AB 302 is encoded with receive table values 304, including a source value, e.g., source A or source B, that indicates the source of the inbound packet 104, a destination value, e.g., destination X, that indicates the destination to which the packet is headed. The source and destination values may be network addresses, MAC addresses, or incoming labels, or the like. The transmit modification index, e.g., index 1, is the assigned index value 306 to which packets having a matching source and/or destination value will be mapped for purposes of packet modification. As shown in FIG. 3, the assigned index value 306 is used to point to the corresponding transmit modification link structure 308. The transmit modification link structure 308, in turn, is used to point to the corresponding command set 310, in this example, command set 1, and the corresponding data set 312, in this example data set 1. The exemplary command set 1 contains two conditional commands, conditional command A 310A and conditional command B 310B. In one embodiment, during operation of command selection, one, both, or neither command may be selected through the application of the mask value 124 generated during the receive processor cycles for the inbound packet 104, which will be described in further detail in the figures FIGS. 4A-4B, 5A-5B, 6 and 7 that follow.

Figure 5A:
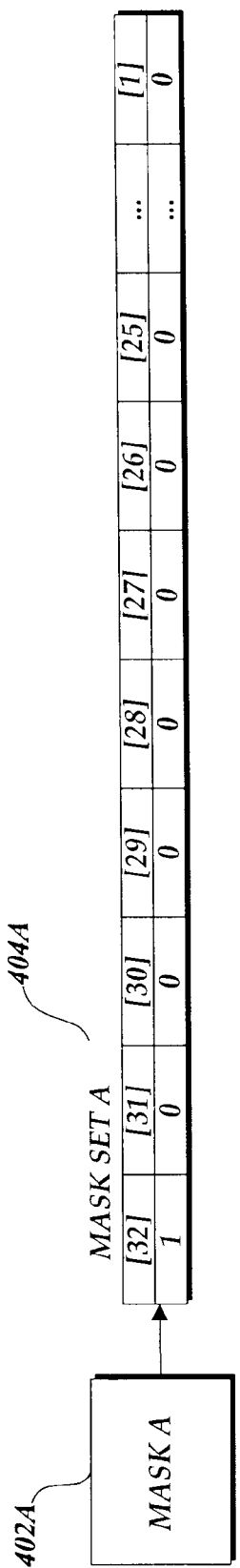
Figure 5B:
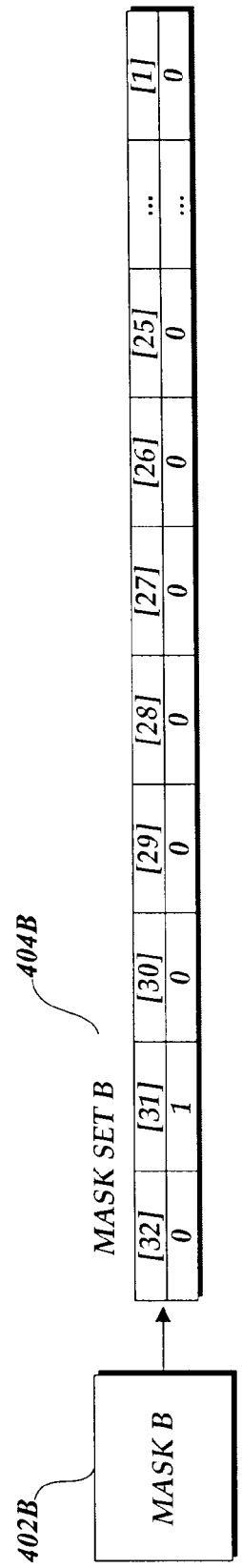

FIGS. 4A-4B, 5A-5B 6 and 7 are block diagrams illustrating exemplary mask values 124 and corresponding mask sets 126 for command selection in a packet-forwarding device in accordance with an embodiment of the invention. In a typical embodiment, the mask set 126 may be implemented as a 32-bit value in which each bit corresponds to a conditional command present in the command set 128/138 to which it applies. FIGS. 5A and 5B show an example of the mask sets A and B 404A and 404B, in which the length of the mask set is 32 bits. For the purposes of illustration, however, the exemplary mask sets A and B, 404A and 404B that are illustrated in FIGS. 4A and 4B and FIGS. 6 and 7 are shown as having just 2-bit values of "10" and "01" respectively, that correspond to the conditional commands 310A/310B present in the exemplary command set 310 of FIG. 3. In any event, it should be understood that other lengths and types of values for the mask set 126 for subsequent use during packet modification may be employed without departing from the scope of the subject matter of the claims of the present invention.

Figure 6:
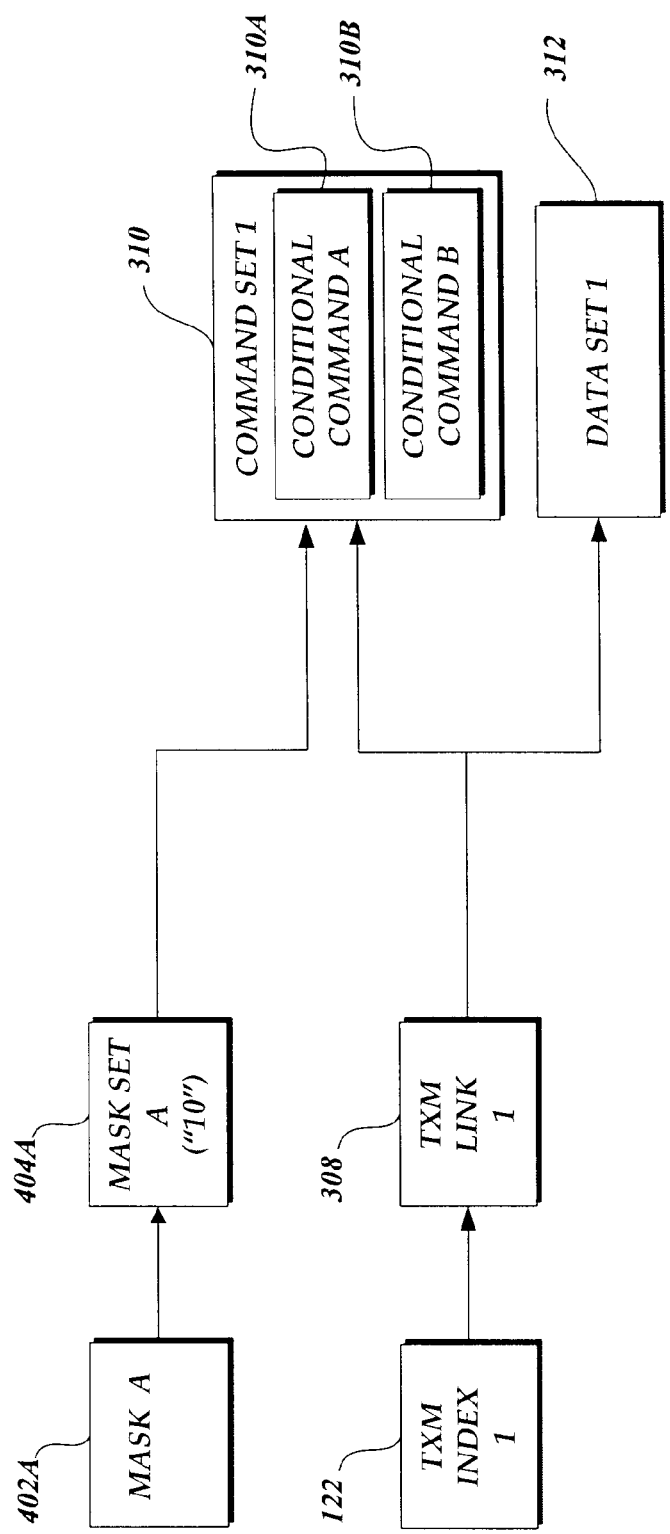
FIGS. 6 and 7 are block diagrams illustrating an example of command selection in a packet-forwarding device in accordance with an embodiment of the invention.
Figure 7:
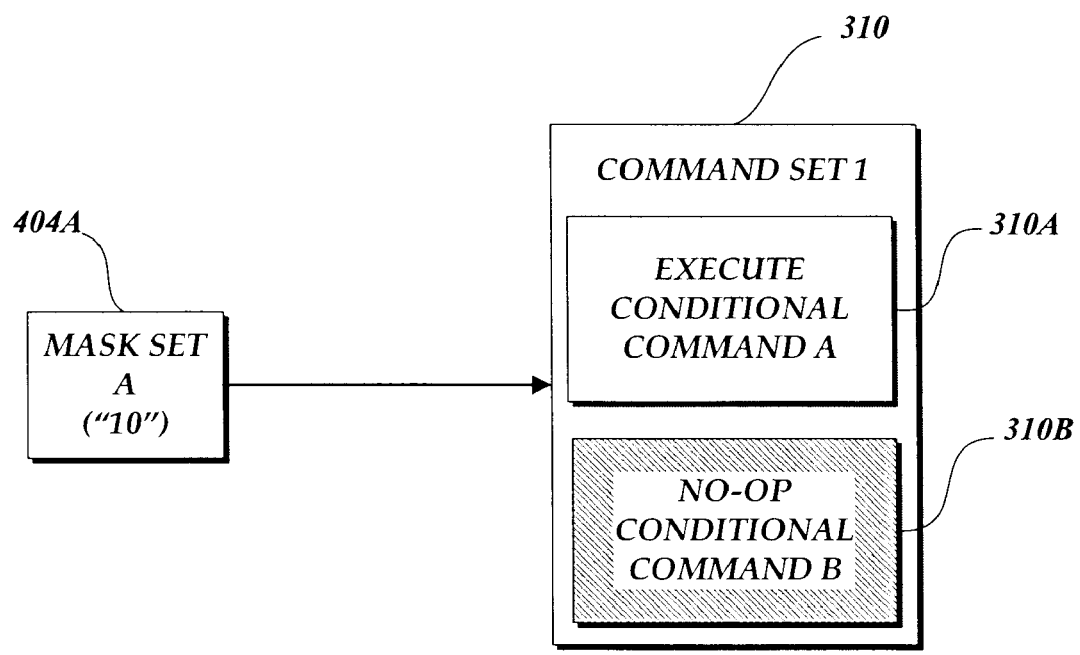

As illustrated, a mask value, mask A 402A, represents a mask value 124 that was generated for an inbound packet 104 originating from source A (as shown in the receive table 302/304 of FIG. 3) with an assigned transmit modification index 1 306. Similarly, mask B 402B represents a mask value 124 that was generated for an inbound packet 104 originating from source B (as shown in the receive table 302/304 of FIG. 3) with an assigned transmit modification index 1 306. As shown in FIG. 6, during the operation of the transmit modification processor 118, mask A 402A points to a corresponding mask set 126, in this case mask set A 404A having a value of "10." Similarly, mask B 402B points to a corresponding mask set 126, in this case mask set B 404B having a value of "01." Thus, during application of the mask set 404A to the command set 1 310, only conditional command A 310A is selected for modifying the inbound packet 104 to produce the outbound packet 106. Likewise, during application of the mask set 404B to the command set 1 310, only conditional command B 310B is selected for modifying the inbound packet 104 to produce the outbound packet 106. In the embodiment shown in FIG. 7, the selection of conditional command A 310A is illustrated, including setting the command not selected, conditional command B 310B, to a 'no-op,' or no operation status to bypass operation. Of course, other techniques of bypassing the command not selected may be employed without departing from the scope of the subject matter of the claims of the present invention.

Figure 8A:
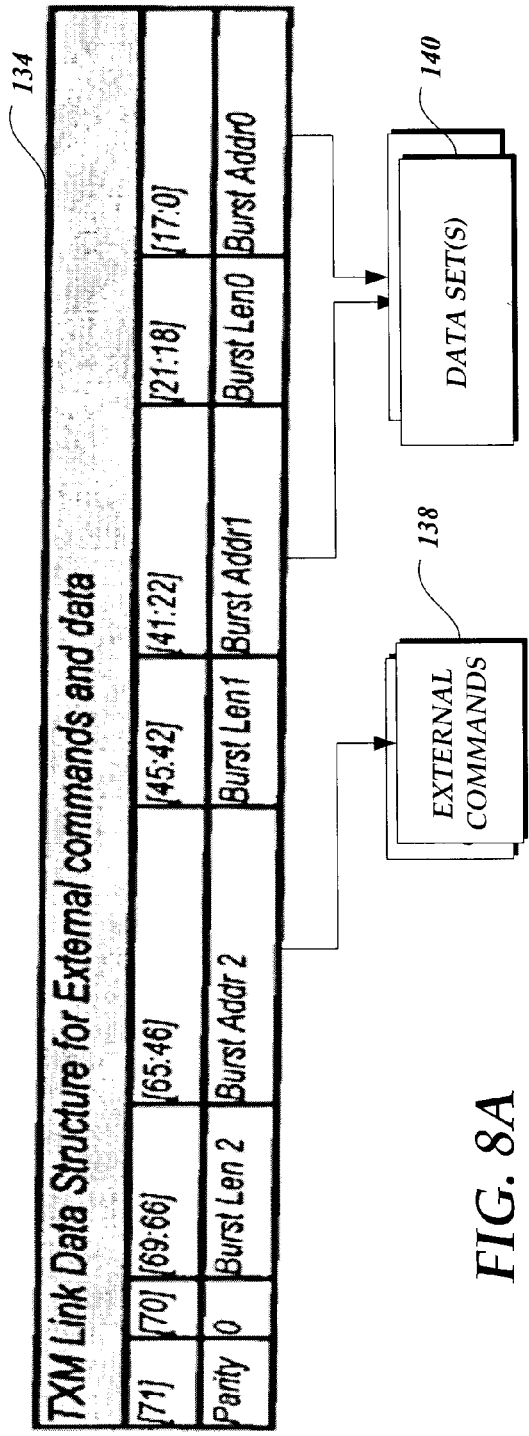
FIGS. 8A-8B and 9 depict exemplary data structures illustrating certain aspects of a link structure and corresponding internal or external command sets and data sets for command selection in a packet-forwarding device in accordance with an embodiment of the invention.
Figure 8B:
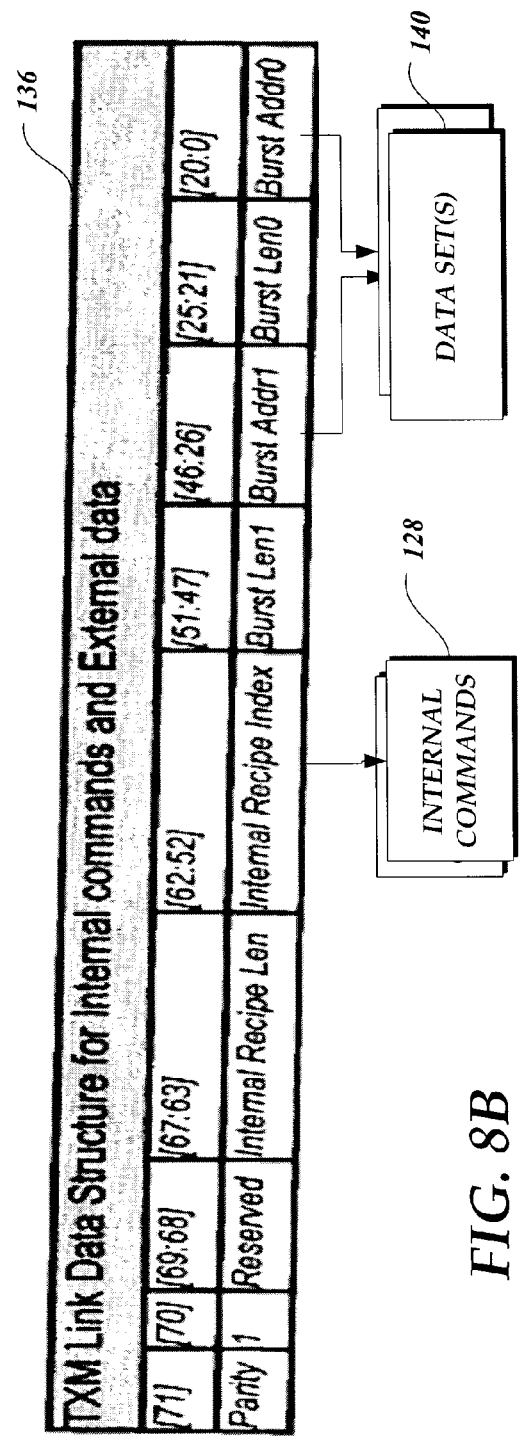
Figure 9:
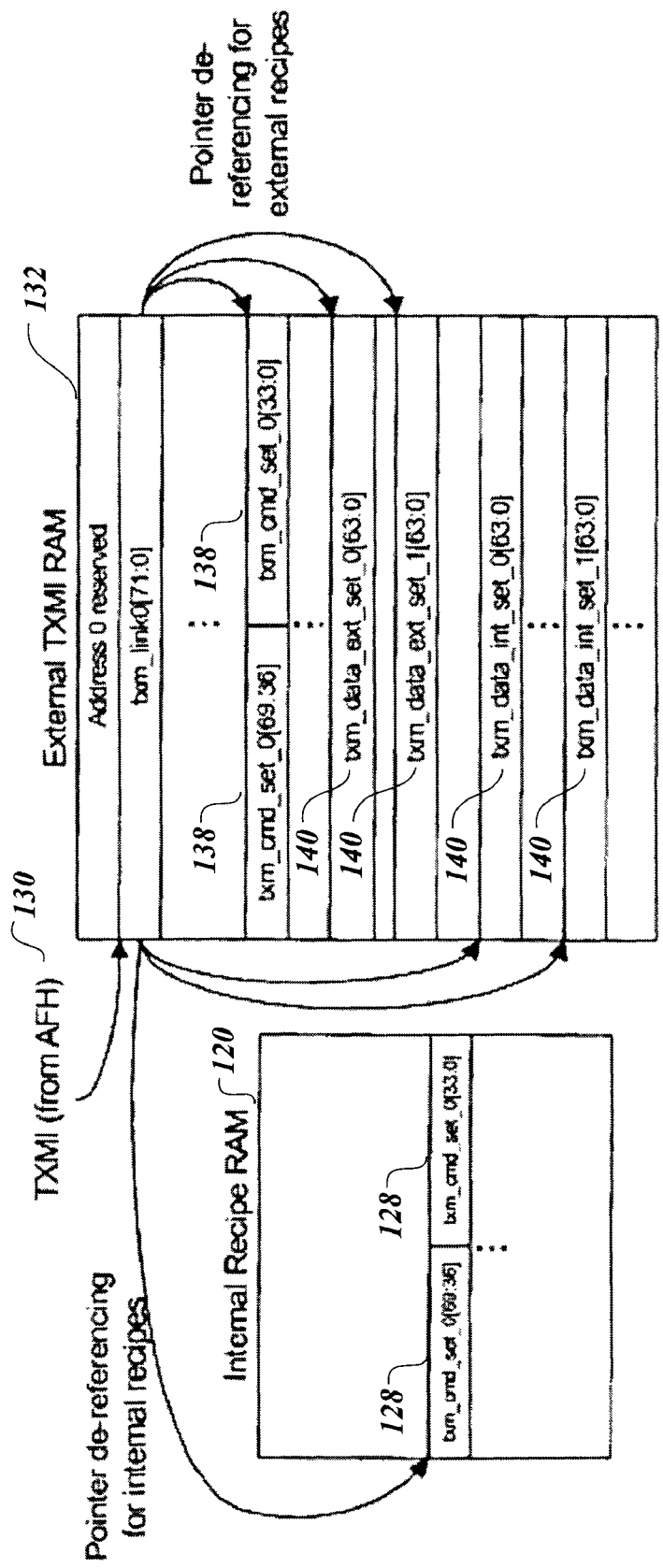

FIGS. 8A-8B and 9 depict exemplary data structures illustrating certain aspects of a transmit modification link structure 134 and corresponding internal or external command sets 128/138 and data sets 140 for command selection in a packet-forwarding device in accordance with an embodiment of the invention. As shown, the transmit modification link structure 134 for either external or internal commands is typically a 72 bit data structure with varying formats. FIG. 9 illustrates an example of the organization of the data structures in internal RAM 120 and external RAM 132.

Figure 10A:
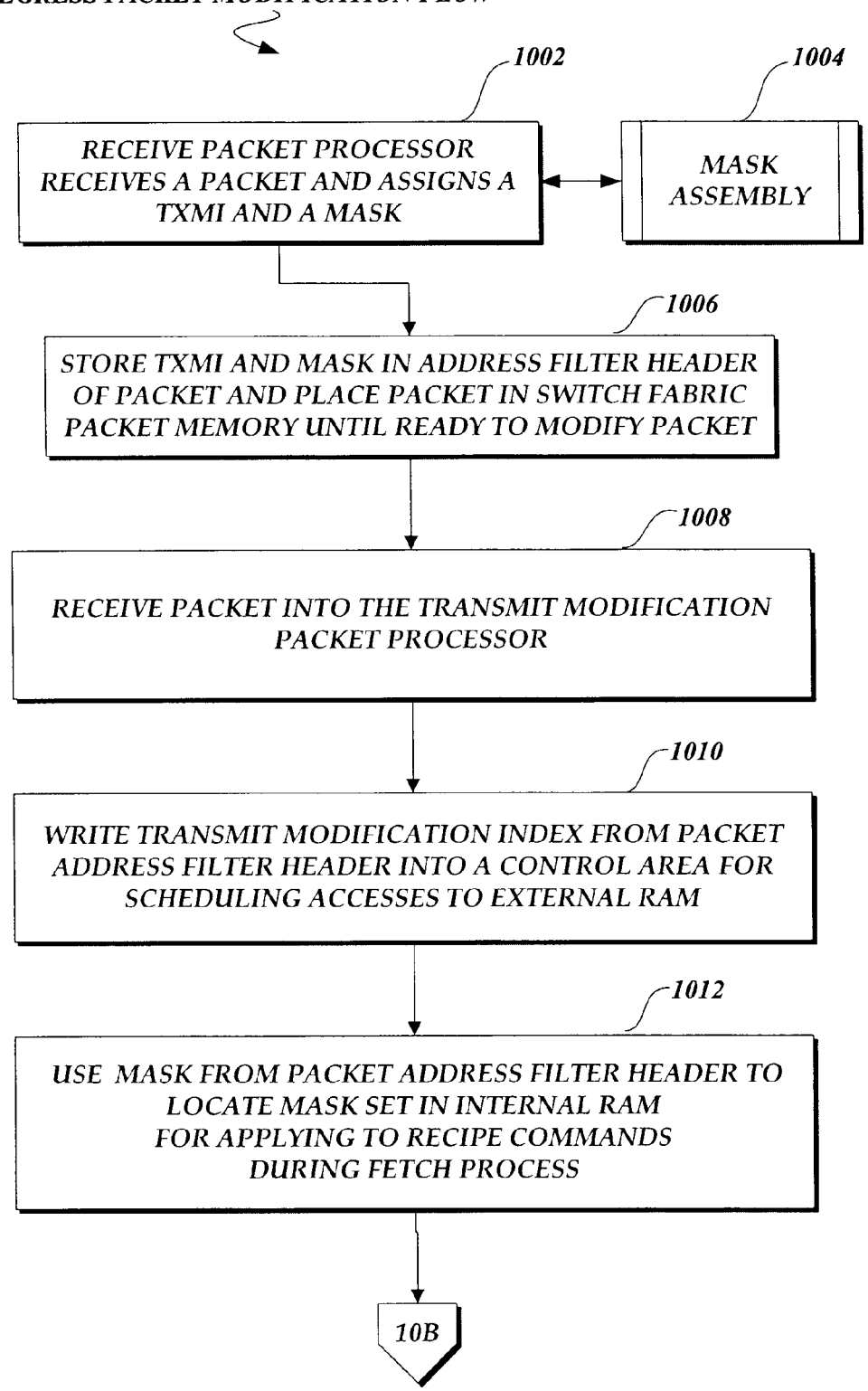
FIGS. 10A-10B are flow diagrams illustrating certain aspects of a method to be performed by a packet-forwarding device incorporating command selection in accordance with an embodiment of the invention.
Figure 10B:
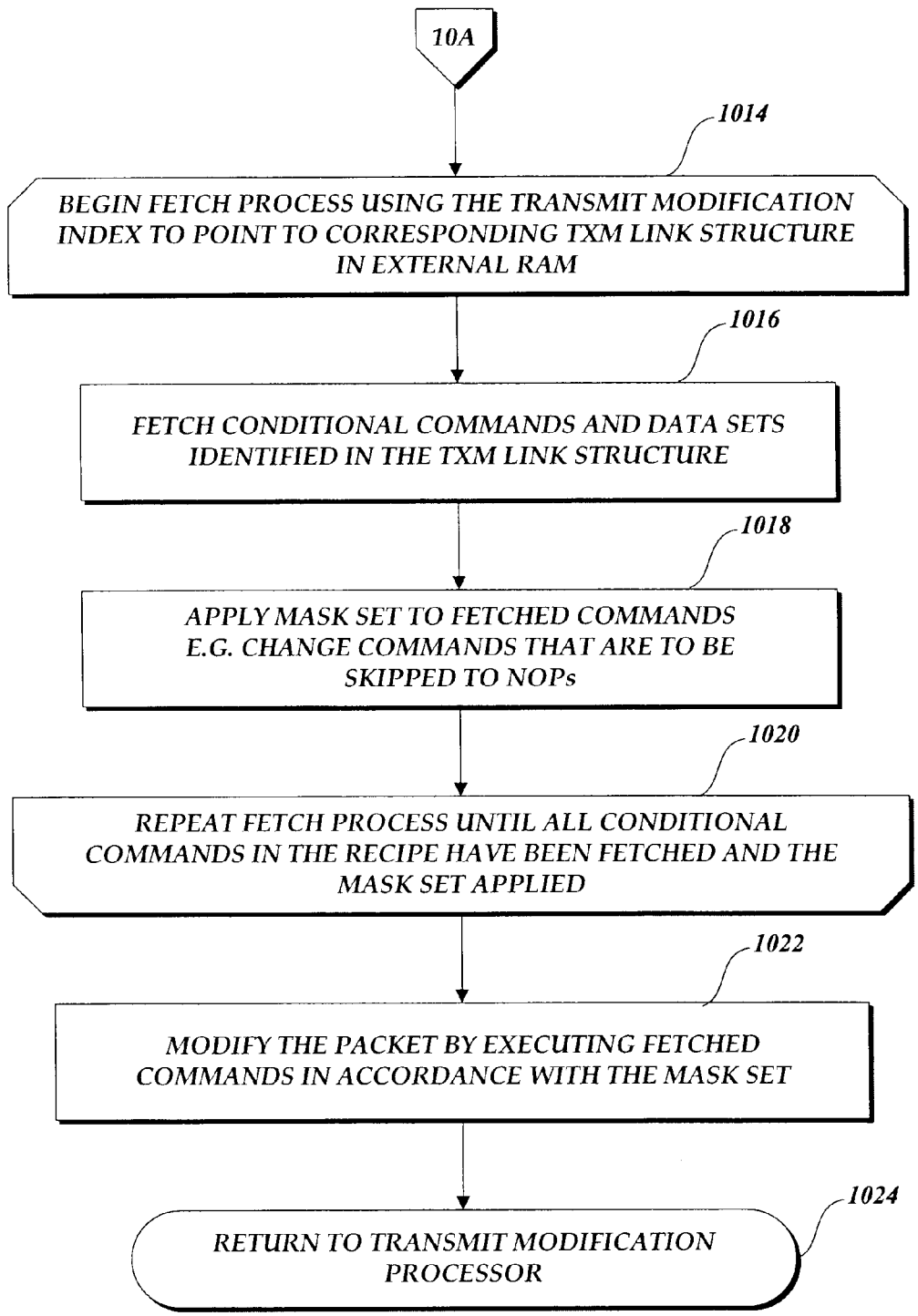

FIGS. 10A-10B are flow diagrams illustrating certain aspects of a method 1000 to be performed by a packet-forwarding device incorporating command selection in accordance with an embodiment of the invention. At processing block 1002, the method 1000 receives a packet and performs the appropriate receive table lookup to obtain the assigned transaction modification index and to assemble the corresponding mask value using a mask assembly process 1004 (see FIG. 11 for further detail of the mask assembly process). At process block 1006, the method 1000 stores the assigned transaction modification index and mask value in the address filter header (AFH) of the packet and places the packet in switch fabric memory until ready to modify the packet. At process block 1008, the packet is received into the transmit modification packet processor, and the method 1000 continues at process block 1010 to write the transmit modification index from the packet's AFH into a control area for scheduling accesses to external RAM. At process block 1012, the method 1000 uses the mask value obtained from the packet's AFH to locate a mask set in internal RAM for applying the mask set to the appropriate command set or sets (i.e. those command set/sets pointed to by the transmit modification index), also referred to as command recipes, during the fetch processing.

In a typical embodiment, the method 1000 continues at process block 1014 to begin the fetch process using the transmit modification index to point to the corresponding transmit modification link structure in external RAM, at process block 1016 to fetch the conditional commands and data sets identified in the corresponding transmit modification link structure, and at process block 1018 to apply the mask set to the fetched commands, for example, by changing those conditional commands that are not selected in accordance with the mask set to no-operation, or NOPs. At process block 1020, the fetch process is repeated until all the conditional commands in the command sets (or command recipes) have been fetched and their corresponding mask sets applied.

In a typical embodiment, at process block 1022, the method 1000 modifies the inbound packet by executing the fetched commands selected for execution in accordance with the mask set. Upon generation of the corresponding modified outbound packet, the method 1000 returns control to the transmit modification processor to process the next inbound packet.

Figure 11:
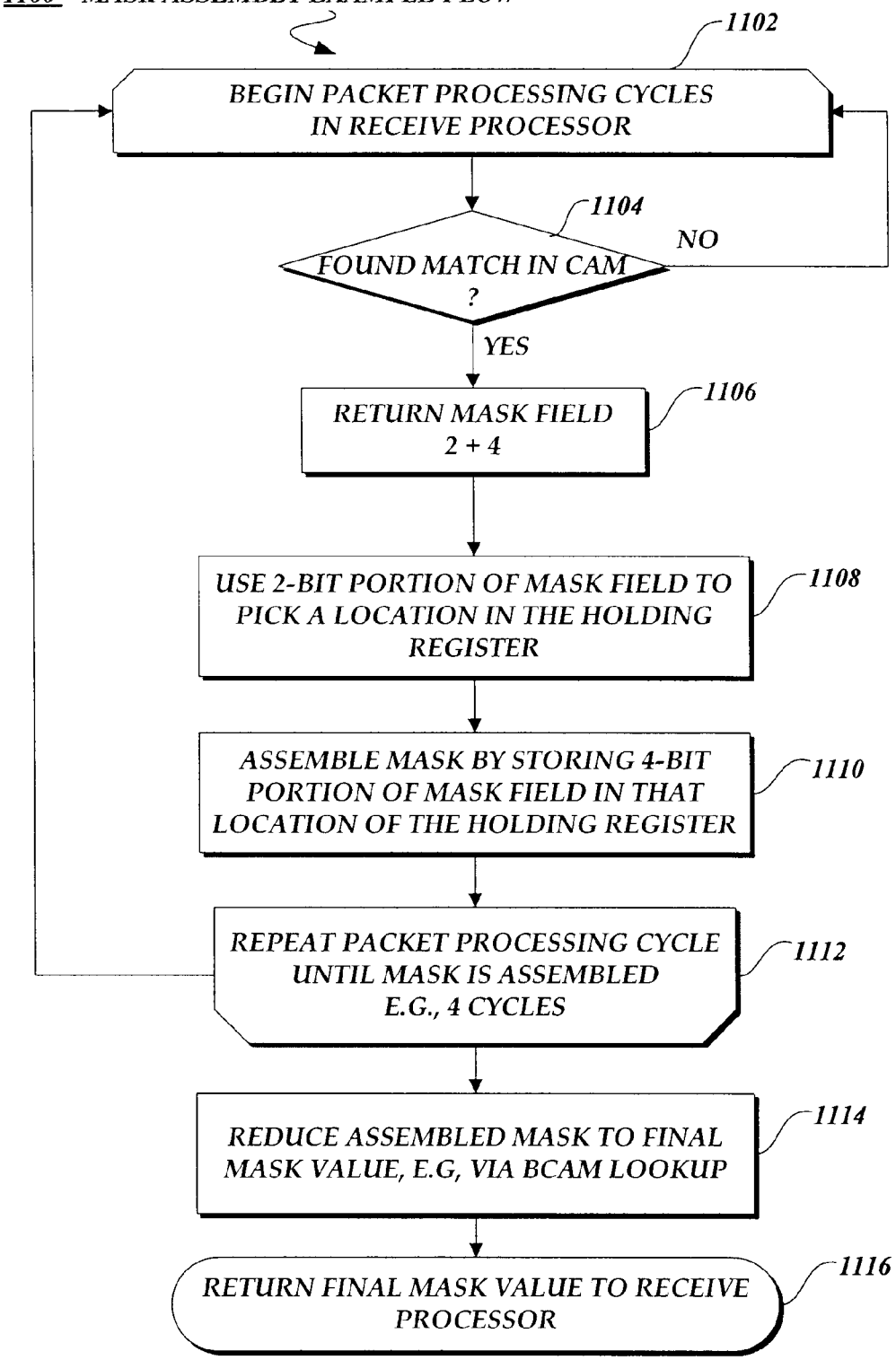
FIG. 11 is a flow diagram illustrating certain aspects of a method to be performed by a packet-forwarding device incorporating command selection in accordance with an embodiment of the invention.

FIG. 11 is a flow diagram illustrating certain aspects of a method to be performed by a packet-forwarding device incorporating command selection in accordance with an embodiment of the invention. Specifically, FIG. 11 illustrates an example mask assembly method 1100 corresponding to the mask assembly overview illustrated in FIG. 2. The method 1100 begins at process block 1102 and determines at decision block 1104 whether the inbound packet has a match in the external CAM. If so, a mask field of 2 plus 4 bits is returned, and at process block 1108 the method 1100 uses the 2-bit portion of the mask field to pick a location in a holding register, and at process block 1110 assembles the mask by storing the 4-bit portion of the mask field in the picked location of the holding register. At process block 1112, the method 1100 continues the processor cycles until the entire mask is assembled, typically over four receive processor cycles. At process block 1114, the method 1100 reduces the assembled mask to a final mask value, for example by performing a binary CAM lookup. At termination block 1116, the method 1100 returns the final mask value to the receive processor.

Figure 12:
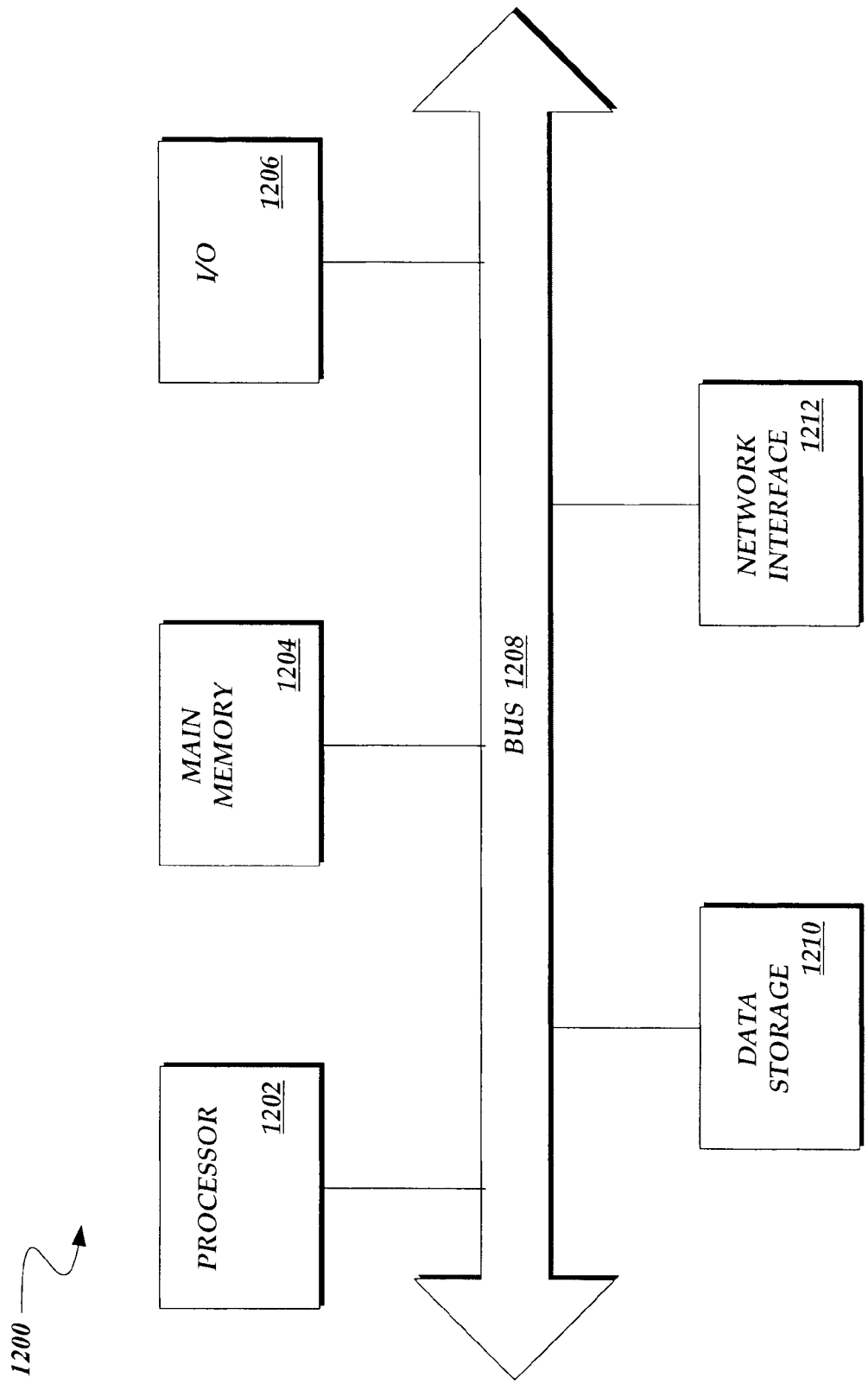
FIG. 12 illustrates one embodiment of a suitable computing environment in which certain aspects of the invention illustrated in FIGS. 1-11 may be practiced.

FIG. 12 illustrates one embodiment of a suitable computing environment in which certain aspects of the invention illustrated in FIGS. 1-11 may be practiced. In one embodiment, the method for a command selection in a packet forwarding device may be implemented on a computer system 1200 having components 1201-1206, including a processor 1201, a memory 1202, an Input/Output device 1203, a data storage 1204, and a network interface 1205, coupled to each other via a bus 1208. The components perform their conventional functions known in the art and provide the means for implementing the method and system for command selection in a packet forwarding device. Collectively, these components represent a broad category of hardware systems, including but not limited to general purpose computer systems and specialized packet-forwarding devices.

In one embodiment, the memory component 1202, may include one or more of random access memory (RAM), content addressable memory (CAM) and nonvolatile storage devices (e.g., magnetic or optical disks) on which are stored instructions and data for use by processor 1201, including the instructions and data that comprise the switch fabric 114 and switch fabric components, as well as the external CAM 110, receive processor 108, transmit modification processor 118 and internal and external RAM 120/132 and any other components of the method and system for command selection.

In one embodiment, the data storage component 1204 may also represent the index and mask values used by the address filter/packet processor and transmit modification processors as well as any receive/forwarding tables, and any other storage areas such as packet buffers, etc., used by the packet-forwarding device 102 and switch fabric 114 for forwarding network packets.

It is to be appreciated that various components of computer system 1200 may be rearranged, and that certain implementations of the present invention may not require nor include all of the above components. Furthermore, additional components may be included in system 1200, such as additional processors (e.g., a digital signal processor), storage devices, memories, network/communication interfaces, etc.

In the illustrated embodiment of FIG. 12, the method and apparatus for command selection in a packet forwarding device in accordance with one embodiment of the invention as discussed above may be implemented as a series of software routines executed by computer system 1200. The software routines may comprise a plurality or series of instructions, code sequences, configuration information, or other data to be accessed and/or executed by a processing system such as one or more of processor 1201. Initially, the series of instructions, code sequences, configuration information, or other data may be stored on a data storage 1204 and transferred to memory 1202 via bus 1208. It is to be appreciated that the series of instructions, code sequences, configuration information, or other data can be stored on a data storage 1204 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a remote storage device, such as a server on a network, accessible via a network/communication interface 1205. The instructions, code sequences, configuration information, or other data may be copied from the data storage 1204, such as mass storage, into a memory 1202 and accessed and executed by processor 1201.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for command selection and packet modification in a packet forwarding device. From the foregoing description, those skilled in the art will recognize that many other variations of the present invention are possible. In particular, while the present invention has been described as being implemented in a network comprising one or more packet-forwarding devices 102 in a packet switched network, some of the logic may be distributed in other components of a network or internetwork application. Thus, the present invention is not limited by the details described. Instead, the present invention can be practiced with modifications and alterations within the spirit and scope of the appended claims.

What is claimed is:

1. A method for packet modification in a packet forwarding device, the method comprising:
   determining a transmit modification index associated with an inbound packet, the transmit modification index pointing to a command set for modifying the inbound packet, the command set containing at least one conditional command;
   assembling a mask value associated with the inbound packet;
   locating a mask set based on the mask value, the mask set associated with the command set, the mask set containing binary values corresponding to positions of conditional commands in the command set;
   applying the mask set to the command set for modifying the inbound packet; and
   modifying the inbound packet to produce a modified outbound packet in accordance with the application of the mask set to the command set; and
   wherein applying the mask set to the command set for modifying the inbound packet comprises:
      fetching each conditional command in the command set;
      determining whether the fetched conditional command is selected based on a binary value in the mask set, the binary value corresponding to a position of the fetched conditional command in the command set; and
      changing the fetched conditional command to a no operation command when the binary value in the mask set corresponding to the position of the fetched conditional command in the command set indicates the fetched conditional command has not been selected for execution.

2. The method of claim 1, wherein determining the transmit modification index associated with the inbound packet is performing a lookup in a receive table mapping identifying information from the packet with the transmit modification index, the transmit modification index having been previously assigned to packets matching the identifying information.

3. The method of claim 2, wherein the identifying information is at least one of a source identification indicating the source of the inbound packet, a destination identification indicating the destination of the inbound packet, and a label associated with the packet.

4. The method of claim 1, wherein the binary value in the mask set that indicates the fetched conditional command has not been selected for execution is zero and the binary value in the mask set that indicates the fetched conditional command has been selected for execution is one.

5. The method of claim 1, wherein assembling the mask value associated with the inbound packet comprises:
   returning an associated RAM resident mask data for each packet processor cycle in which the inbound packet matches a lookup table in first external CAM;
   picking a location in a holding register based on a first portion of the returned mask data;
   storing a second portion in the picked location of the holding register; and
   reducing the stored portions in the holding register to a final value obtained from a second binary CAM matching the stored portions in the holding register.

6. A packet forwarding device supporting packet modification, the device comprising:
   a receive table memory in which is stored a transmit modification index associated with identifying information of an inbound packet, the transmit modification index pointing to a command set for modifying the inbound packet;
   a command set memory in which is stored the command set, the command set having at least one conditional command for modifying the inbound packet;
   a receive processor for assembling a mask value associated with the inbound packet and locating a mask set based on the mask value, the mask set associated with the command set, the mask set containing binary values corresponding to positions of conditional commands in the command set;
   a transmit modification processor for applying the mask set to the at least one conditional command in the command set for modifying the packet, and modifying the inbound packet to produce a modified outbound packet in accordance with the application of the mask set to the command set;
   wherein the transmit modification processor for applying the mask set to the command set for modifying the inbound packet performs:
      fetching each conditional command in the command set;
      determining whether the fetched conditional command is selected based on a binary value in the mask set, the binary value corresponding to a position of the fetched conditional command in the command set; and
      changing the fetched conditional command to a no operation command when the binary value in the mask set corresponding to the position of the fetched conditional command in the command set indicates the fetched conditional command has not been selected for execution.

7. The device of claim 6, wherein the receive processor determines the transmit modification index associated with the inbound packet by performing a lookup in the receive table memory, the lookup mapping identifying information from the packet with the transmit modification index, the transmit modification index having been previously assigned to packets matching the identifying information.

8. The device of claim 7, wherein the identifying information is at least one of a source identification indicating the source of the inbound packet, a destination identification indicating the destination of the inbound packet, and a label associated with the packet.

9. The device of claim 6, wherein the binary value in the mask set that indicates the fetched conditional command has not been selected for execution is zero and the binary value in the mask set that indicates the fetched conditional command has been selected for execution is one.

10. The device of claim 6, wherein the receive processor for assembling the mask value associated with the inbound packet performs:
   returning an associated RAM resident mask data for each packet processor cycle in which the inbound packet matches a lookup table in first external CAM;
   picking a location in a holding register based on a first portion of the returned mask data;
   storing a second portion in the picked location of the holding register; and
   reducing the stored portions in the holding register to a final value obtained from a second binary CAM matching the stored portions in the holding register.

11. A machine-implemented method for packet modification in a packet forwarding device, the method comprising:
   means for determining a transmit modification index associated with an inbound packet, the transmit modification index pointing to a command set for modifying the inbound packet, the command set containing at least one conditional command;
   means for assembling a mask value associated with the inbound packet;
   means for locating a mask set based on the mask value, the mask set associated with the command set, the mask set containing binary values corresponding to positions of conditional commands in the command set;
   means for applying the mask set to the command set for modifying the inbound packet;
   means for modifying the inbound packet to produce a modified outbound packet in accordance with the application of the mask set to the command set; and
   wherein the means for applying the mask set to the command set for modifying the inbound packet comprises:
      means for fetching each conditional command in the command set;
      means for determining whether the fetched conditional command is selected based on a binary value in the mask set, the binary value corresponding to a position of the fetched conditional command in the command set; and
      means for changing the fetched conditional command to a no operation command when the binary value in the mask set corresponding to the position of the fetched conditional command in the command set indicates the fetched conditional command has not been selected for execution.

12. The method of claim 11, wherein the means for determining the transmit modification index associated with the inbound packet is a means for performing a lookup in a receive table mapping identifying information from the packet with the transmit modification index, the transmit modification index having been previously assigned to packets matching the identifying information.

13. The method of claim 12, wherein the identifying information is at least one of a source identification indicating the source of the inbound packet, a destination identification indicating the destination of the inbound packet, and a label associated with the packet.

14. The method of claim 11, wherein the binary value in the mask set that indicates the fetched conditional command has not been selected for execution is zero and the binary value in the mask set that indicates the fetched conditional command has been selected for execution is one.

15. The method of claim 11, wherein the means for assembling the mask value associated with the inbound packet comprises:
   means for returning an associated RAM resident mask data for each packet processor cycle in which the inbound packet matches a lookup table in first external CAM;
   means for picking a location in a holding register based on a first portion of the returned mask data;
   means for storing a second portion in the picked location of the holding register; and
   means for reducing the stored portions in the holding register to a final value obtained from a second binary CAM matching the stored portions in the holding register.

* * * * *